(12) United States Patent
Takasugi et al.

(10) Patent No.: US 7,266,065 B2
(45) Date of Patent: Sep. 4, 2007

(54) APPARATUS FOR DISCRIMINATING OPTICAL RECORDING MEDIUM AND METHOD FOR DISCRIMINATING OPTICAL RECORDING MEDIUM

(75) Inventors: Yasufumi Takasugi, Tokyo (JP); Kazuo Fukunaga, Tokyo (JP); Toshikazu Hosobuchi, Tokyo (JP); Takashi Namioka, Tokyo (JP); Giichi Shibuya, Tokyo (JP); Hideki Hirata, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 213 days.

(21) Appl. No.: 10/512,522

(22) PCT Filed: Apr. 25, 2003

(86) PCT No.: PCT/JP03/05349

§ 371 (c)(1),
(2), (4) Date: Oct. 25, 2004

(87) PCT Pub. No.: WO03/091993

PCT Pub. Date: Jun. 11, 2003

(65) Prior Publication Data

US 2005/0237913 A1    Oct. 27, 2005

(30) Foreign Application Priority Data

Apr. 25, 2002    (JP) .............................. 2002-123791

(51) Int. Cl.
*G11B 7/26* (2006.01)

(52) U.S. Cl. ...................... 369/53.2; 720/606; 720/601

(58) Field of Classification Search ............... 369/30.3; 720/601, 606
See application file for complete search history.

(56) References Cited

U.S. PATENT DOCUMENTS

| 5,844,873 | A | * | 12/1998 | Aoyama et al. ............. 720/676 |
| 5,898,649 | A | * | 4/1999 | Park .......................... 369/30.3 |
| 6,977,883 | B2 | * | 12/2005 | Terao et al. ................. 369/276 |
| 2004/0114913 | A1 | * | 6/2004 | Kume .......................... 386/125 |

FOREIGN PATENT DOCUMENTS

| JP | 10055601 | | 2/1998 |
| JP | 10-143986 | | 5/1998 |
| JP | 10143986 A | * | 5/1998 |

* cited by examiner

*Primary Examiner*—Wayne Young
*Assistant Examiner*—Linh T. Nguyen
(74) *Attorney, Agent, or Firm*—Seed IP Law Group PLLC

(57) ABSTRACT

It is an object of the present invention is to provide an apparatus for discriminating an optical recording medium and a method for discriminating an optical recording medium which can reliably discriminate the kind of an optical recording medium even in the case where the optical recording medium to be discriminated is formed with periodical undulation in the circumferential direction thereof. The apparatus for discriminating an optical recording medium according to the present invention includes a first electrode 11, a second electrode 12, an alternate current signal generation circuit 13 for applying an alternate current A to the first electrode 11, a detection circuit 14 for detecting a level of an alternate current B appearing at the second electrode 12, and a control circuit 15 for controlling the operations of the alternate current signal generation circuit 13 and the detection circuit 14.

10 Claims, 16 Drawing Sheets

(a)

(b)

APPARATUS FOR DISCRIMINATING OPTICAL RECORDING MEDIUM AND METHOD FOR DISCRIMINATING OPTICAL RECORDING MEDIUM

BACKGROUND OF THE INVENTION

The present invention relates to an apparatus for discriminating an optical recording medium and a method for discriminating an optical recording medium, and particularly, to an apparatus for discriminating an optical recording medium and a method for discriminating an optical recording medium which can reliably discriminate the kind of an optical recording medium.

DESCRIPTION OF THE PRIOR ART

Optical recording media such as the CD, DVD and the like have been widely used as recording media for recording digital data and compatible drives capable of reproducing data recorded in different optical recording media such as the CD, DVD and the like or recording and reproducing data therein and therefrom have recently been actively developed.

Particularly, next-generation type optical recording media having large data recording capacity and an extremely high data transfer rate have recently been actively developed and it is expected that the kinds of optical recording media will further increase.

In such a compatible drive, it is necessary to discriminate the kind of an optical recording medium set therein but since the shapes of these different kinds of optical recording media are standardized, it is impossible to discriminate the kind of an optical recording medium set therein based on the shape thereof.

Therefore, a compatible drive is generally constituted so as to discriminate the kind of an optical recording medium set therein by actually projecting a laser beam onto the optical recording medium set therein and judging whether or not a normal signal can be reproduced.

For example, a compatible drive capable of reproducing data recorded in both CD and DVD is constituted so that when a distance between a light incidence plane and a recording layer (reflective layer) is measured by conducting focus searching and it is judged that the distance between the light incidence plane and the recording layer (reflective layer) is about 1.1 mm, a laser beam having a wavelength of 780 nm for a CD is selected and that when it is judged that the distance between the light incidence plane and the recording layer (reflective layer) is about 0.6 mm, a laser beam having a wavelength of 650 nm for a DVD is selected.

However, in the case of discriminating the kind of an optical recording medium by conducting focus searching in this manner, a long time is required for discriminating the kind of the optical recording medium and a long period is required between the time when the optical recording medium is set in the drive and the time when data can be actually recorded in or reproduced from the optical recording medium.

Therefore, Japanese Patent Application Laid Open No. 10-143986 proposes a method for discriminating an optical recording medium by providing an electrode in a tray of a drive and applying an alternating current signal to the electrode, thereby discriminating the kind of an optical recording medium placed on the tray.

However, in the method disclosed in Japanese Patent Application Laid Open No. 10-143986, the discriminating accuracy is lowered as described below when there is undulation or the like on the optical recording medium to be discriminated in the circumferential direction thereof.

FIG. 14 is a schematic cross-sectional view showing a tray provided with an electrode for detection that is used in Japanese Patent Application Laid Open No. 10-143986.

As shown in FIG. 14, the tray 1 includes a setting portion 1a on which an optical recording medium having a diameter of 120 mm is to be placed and electrodes 2, 3 for detecting the kind of the optical recording medium.

Further, a shoulder portion 4 is provided on the outer circumferential portion of the setting portion 1a so that when an optical recording medium is placed on the tray 1, the optical recording medium is held on the shoulder portion 4. Therefore, when an optical recording medium is placed on the tray 1, the recording surface of the optical recording medium (which in the case of an optical recording medium having a diameter of 120 mm is a region in which data are recorded that corresponds to that of the light incidence plane and has an inner diameter of 50 mm and an outer diameter of 117 mm) is kept from being brought into direct contact with the tray 1, thereby preventing the recording surface of the optical recording medium from being damaged.

FIG. 15 is a schematic perspective view showing an optical recording medium formed with periodical undulation in the circumferential direction thereof. FIG. 16(a) is a schematic cross-sectional view taken along a line C-C in FIG. 15 and FIG. 16(b) is a schematic cross-sectional view taken along a line D-D in FIG. 15.

As shown in FIG. 15, the optical recording medium 20 is formed with four convex portions 29a and four concave portions 29b in the circumferential direction thereof and in FIG. 15 and FIG. 16, the convex portions 29a and the concave portions 29b are exaggerated.

In the case where the optical recording medium 20 is formed with periodical undulation in the circumferential direction thereof in this manner, the optical recording medium 20 is warped in one direction at one cross-section thereof (cross-section along the line C-C in FIG. 15) and it is warped in the other direction at another cross-section (cross-section along the line D-D in FIG. 15). As a result, in the case where the optical recording medium 20 is placed on the tray 1 shown in FIG. 14, distances between the electrodes 2, 3 for detection and conductive layers such as a reflective layer included in the optical recording medium 20 greatly vary depending upon how the optical recording medium 20 is placed on the tray 1.

FIG. 17 is a schematic cross-sectional view showing the state where the optical recording medium 20 is placed on the tray 1 where FIG. 17(a) shows the case where a line connecting the electrodes 2, 3 substantially coincides with the line C-C in FIG. 15 and FIG. 17(b) shows the case where a line connecting the electrodes 2, 3 substantially coincides with the line D-D in FIG. 15. The cross-section corresponding to the concave portion 29b is indicated by a broken line in FIG. 17(a) and the cross-section corresponding to the convex portion 29a is indicated by a broken line in FIG. 17(b).

As shown in FIG. 17(a), in the case where the electrodes 2, 3 are located so as to face the convex portion 29a of the optical recording medium 20 placed on the tray 1, distances between the electrodes 2, 3 for detection provided in the tray 1 and a conductive layer(s) such as a reflective layer included in the optical recording medium become longer than that in the case where the optical recording medium is not warped and has no undulation and, on the other hand, as shown in FIG. 17(b), in the case where the electrodes 2, 3 are located so as to face the concave portion 29b of the optical recording medium 20 placed on the tray 1, distances between the electrodes 2, 3 for detection provided in the tray 1 and a conductive layer(s) such as a reflective layer included in the optical recording medium become longer than in the case where the optical recording medium is not warped and has no undulation but shorter in the case shown in FIG. 17(*a*). Therefore, when an alternating current signal is applied to one of the electrodes 2, 3, the level of a signal obtained from the other of the electrodes 2, 3 varies depending upon how the optical recording medium 20 is placed on the tray 1 and it is therefore difficult to accurately discriminate the kind of the optical recording medium 20.

Although this problem is not so serious in the case of discriminating a CD, DVD or other optical recording media having different focus distances, it becomes very serious in the case of discriminating optical recording media whose focus distances are the same.

In the case of discriminating optical recording media that differ little in the distance between the light incidence plane and a conductive layer such as a reflective layer, for example, in the case where a DVD in which data are to be recorded in one layer on one side and a DVD in which data are to be recorded in two layers on one side are to be discriminated, the results of discrimination are greatly affected by changes in detection signals caused by the undulation of the optical recording media in the circumferential direction thereof.

It is particularly worthy of note that there are being developed next-generation type optical recording media constituted so as to be irradiated with a laser beam having a wavelength equal to or shorter than 450 nm via a light transmission layer disposed opposite to a substrate using an objective lens having a numerical aperture equal to or smaller than 0.7. It is therefore expected that a plurality of kinds of next-generation type optical recording media that differ only slightly in the thickness and material of the light transmission layers will come into practical use. In the case where these next-generation type optical recording media are discriminated using the method disclosed in Japanese Patent Application Laid Open No. 10-143986, the results of the discrimination are very greatly affected by changes in detection signals caused by undulation formed thereon in the circumferential direction thereof.

SUMMARY OF THE INVENTION

It is therefore an object of the present invention to provide an apparatus for discriminating an optical recording medium and a method for discriminating an optical recording medium which can reliably discriminate the kind of an optical recording medium.

It is another object of the present invention to provide an apparatus for discriminating an optical recording medium and a method for discriminating an optical recording medium which can reliably discriminate the kind of an optical recording medium even in the case where the optical recording medium to be discriminated is formed with periodical undulation in the circumferential direction thereof.

It is a further object of the present invention to provide an apparatus for discriminating an optical recording medium and a method for discriminating an optical recording medium constituted so as to be irradiated with a laser beam from a side opposite to a substrate, which can reliably discriminate the kind of an optical recording medium.

The above objects of the present invention can be accomplished by an apparatus for discriminating an optical recording medium comprising at least a first dielectric layer, a second dielectric layer and a conductive layer formed between the first dielectric layer and the second dielectric layer, the apparatus for discriminating an optical recording medium comprising an electrode disposed over an angle equal to or larger than substantially 180 degrees around a center of a tray on which an optical recording medium is to be placed, and means for applying a signal for detection to the electrode, thereby discriminating the kind of an optical recording medium.

According to the present invention, since the electrode used for discriminating the kind of an optical recording medium is disposed over an angle equal to or larger than substantially 180 degrees around the center of a tray on which an optical recording medium is to be placed, it is possible to accurately discriminate the kind of an optical recording medium even in the case where the optical recording medium is formed with periodical undulation in the circumferential direction thereof.

In a preferred aspect of the present invention, the electrode includes a first electrode to which a signal for detection is applied and a second electrode at which a signal depending upon the kind of an optical recording medium appears when the signal for detection is applied to the first electrode.

In a preferred aspect of the present invention, the first electrode and the second electrode are disposed to be spaced from each other and to form at least a part of a substantially annular portion around the center of the tray.

In a further preferred aspect of the present invention, the first electrode and the second electrode are disposed to be spaced from each other in a circumferential direction of the optical recording medium to be placed on the tray and to extend over substantially 180 degrees around the center of the tray.

In another preferred aspect of the present invention, the first electrode and the second electrode are disposed to be spaced from each other in a radial direction of the optical recording medium to be placed on the tray and to extend over an angle equal to or larger than substantially 180 degrees around the center of the tray.

In a further preferred aspect of the present invention, the first electrode and the second electrode are disposed to be spaced from each other in a radial direction of the optical recording medium to be placed on the tray and to extend over substantially 360 degrees around the center of the tray.

The above object of the present invention can be also accomplished by a method for discriminating an optical recording medium comprising at least a first dielectric layer, a second dielectric layer and a conductive layer formed between the first dielectric layer and the second dielectric layer, the method for discriminating an optical recording medium comprising a step of applying a signal for detection to an electrode disposed over an angle equal to or larger than 180 degrees around a center of a tray on which an optical recording medium is to be placed, thereby discriminating the kind of an optical recording medium.

According to the present invention, since the kind of an optical recording medium is discriminated by applying a signal for detection to an electrode disposed over an angle equal to or larger than 180 degrees around the center of a tray on which an optical recording medium is to be placed, it is possible to accurately discriminate the kind of an optical recording medium even in the case where the optical recording medium is formed with periodical undulation in the circumferential direction thereof.

BRIEF DESCRIPTION OF THE DRAWINGS

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

FIG. 13 is a schematic cross-sectional view showing the state where an optical recording medium is placed on a tray, wherein FIG. 13(a) shows the case where an optical recording medium formed with no periodical undulation in the circumferential direction thereof is placed on the tray and FIGS. 13(b) and (c) shows the cases where an optical recording medium formed with a periodical undulation in the circumferential direction thereof is placed on the tray.

FIG. 17 is a schematic cross-sectional view showing the state where an optical recording medium is placed on a tray, wherein FIG. 17(a) shows the case where a line connecting electrodes for detection substantially coincides with the line C-C in FIG. 15 and FIG. 17(b) shows the case where a line connecting the electrodes for detection substantially coincides with the line D-D in FIG. 15.

DESCRIPTION OF THE PREFERRED EMBODIMENTS

Preferred embodiments of the present invention will now be described with reference to accompanying drawings.

Figure 1:
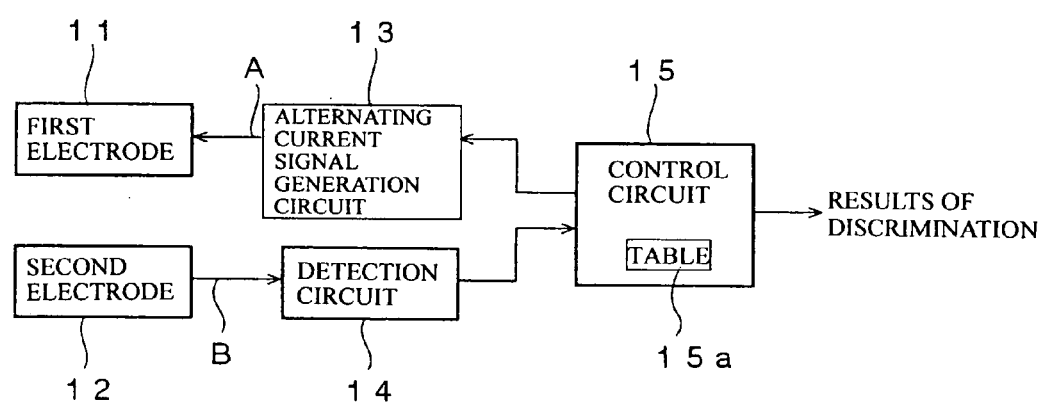
FIG. 1 is a block diagram showing an apparatus for discriminating an optical recording medium that is a preferred embodiment of the present invention.

As shown in FIG. 1, an apparatus for discriminating an optical recording medium that is a preferred embodiment of the present invention includes a first electrode 11 and a second electrode 12, an alternate current signal generation circuit 13 for applying an alternate current signal to the first electrode 11, a detection circuit 14 for detecting the level of an alternate current signal B appearing at the second electrode 12, and a control circuit 15 for controlling the operations of the alternate current signal generation circuit 13 and the detection circuit 14, and a table 15a is provided in the control circuit 15.

The apparatus 10 for discriminating an optical recording medium is adapted to be mounted on a data recording and reproducing apparatus for recording data in and reproducing data from an optical recording medium or a data reproducing apparatus for reproducing data from an optical recording medium (hereinafter collectively referred to as "a drive").

Figure 2:
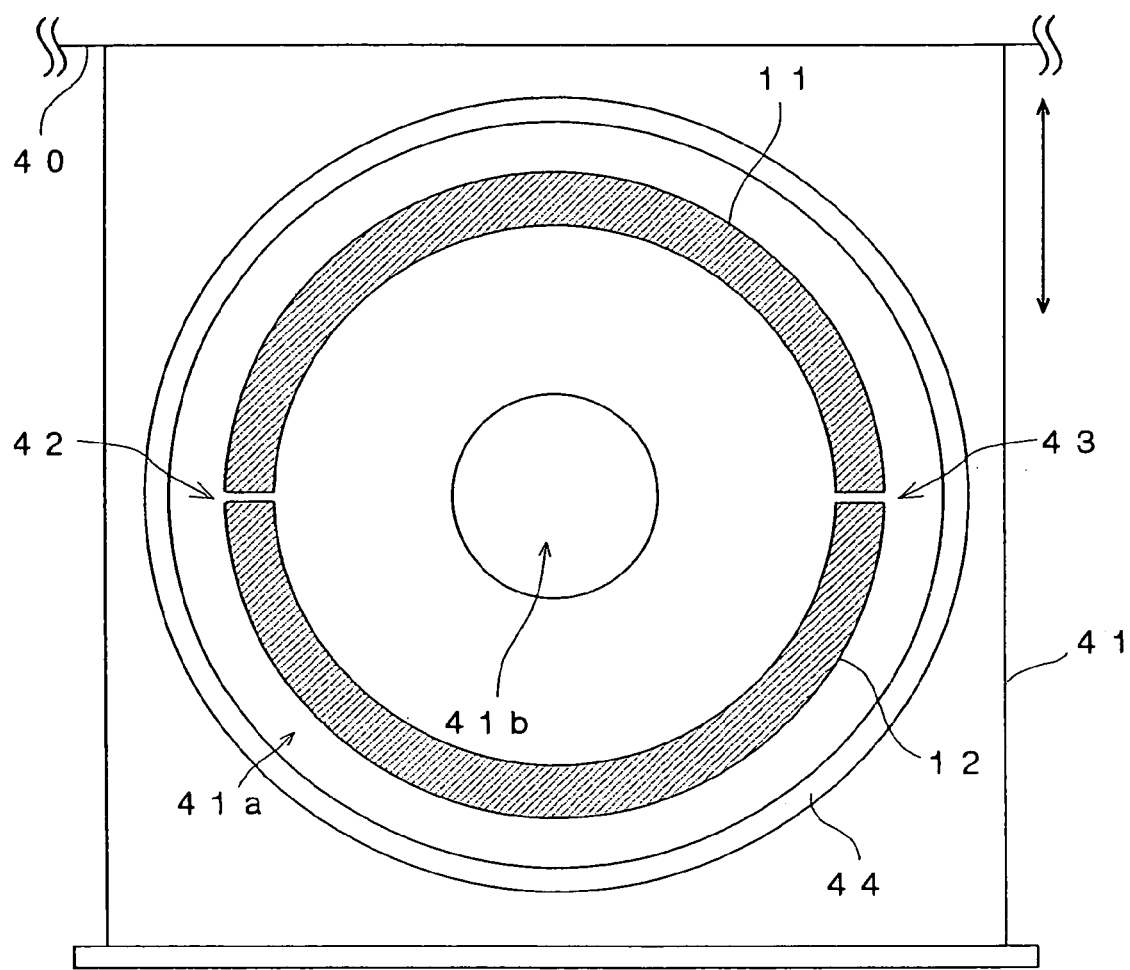
FIG. 2 is a schematic plan view showing a tray which can be accommodated in and discharged from a main body of a drive into which an apparatus for discriminating an optical recording medium that is a preferred embodiment of the present invention is incorporated.

FIG. 2 is a schematic plan view showing a tray which can be accommodated in and discharged from a main body of a drive into which an apparatus for discriminating an optical recording medium that is a preferred embodiment of the present invention is incorporated.

As shown in FIG. 2, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

A shoulder portion 44 is provided on an outer circumferential portion of the optical recording medium setting section 41a so that an optical recording medium is held by the shoulder portion 44 when it is placed on the optical recording medium setting section 41a of the tray 41. Therefore, when an optical recording medium is placed on the optical recording medium setting section 41a of the tray 41, the recording surface of the optical recording medium is kept from being brought into direct contact with the tray 1, thereby preventing the recording surface of the optical recording medium from being damaged.

As shown in FIG. 2, a first electrode 11 and a second electrode 12 are formed annular-like on the optical recording medium setting section 41a in the vicinity of the shoulder portion 44. Each of the first electrode 11 and the second electrode 12 forms substantially a half of the annular portion and gaps 42 and 43 are formed between the first electrode 11 and the second electrode 12.

Figure 3:
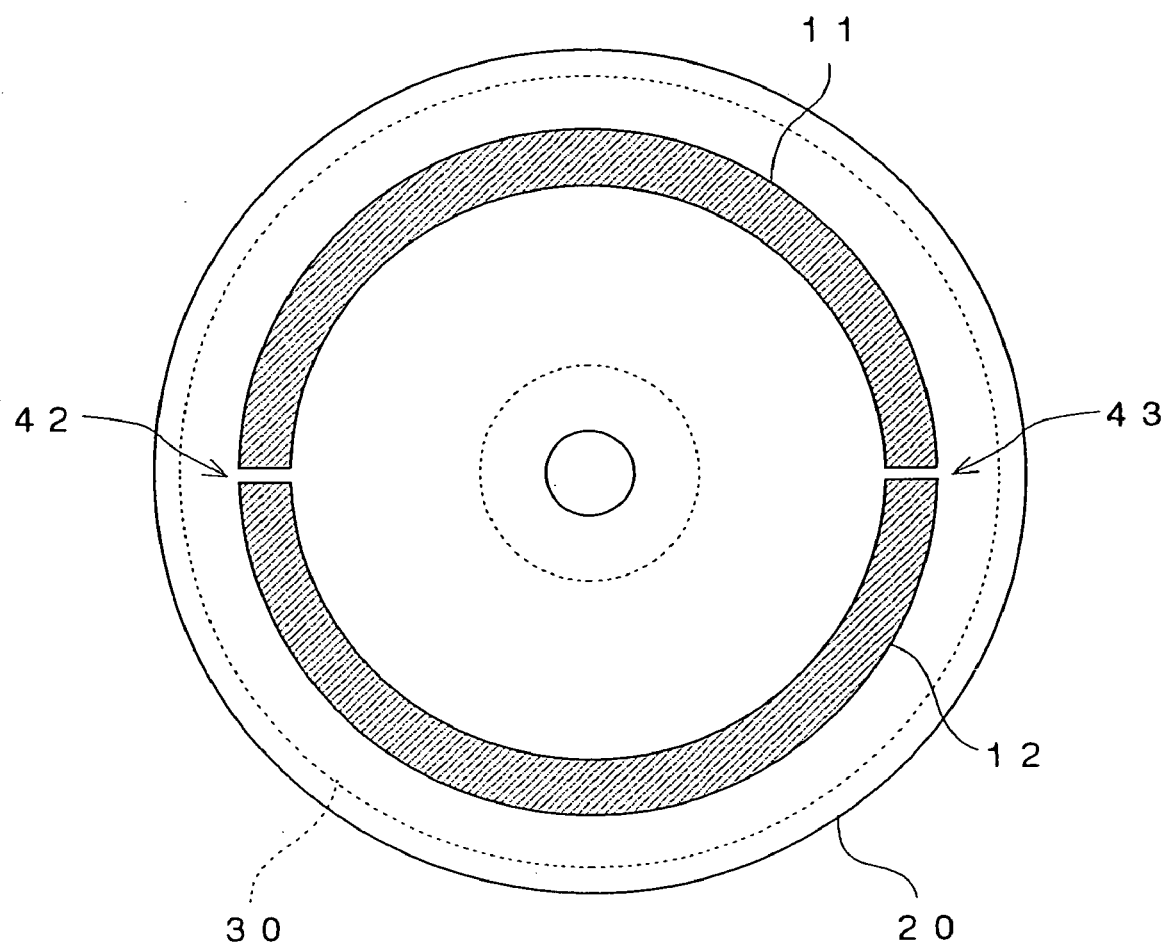
FIG. 3 is a schematic plan view showing a positional relationship between an optical recording medium and a first electrode and a second electrode when the optical recording medium is placed on a tray shown in FIG. 2.
Figure 14:
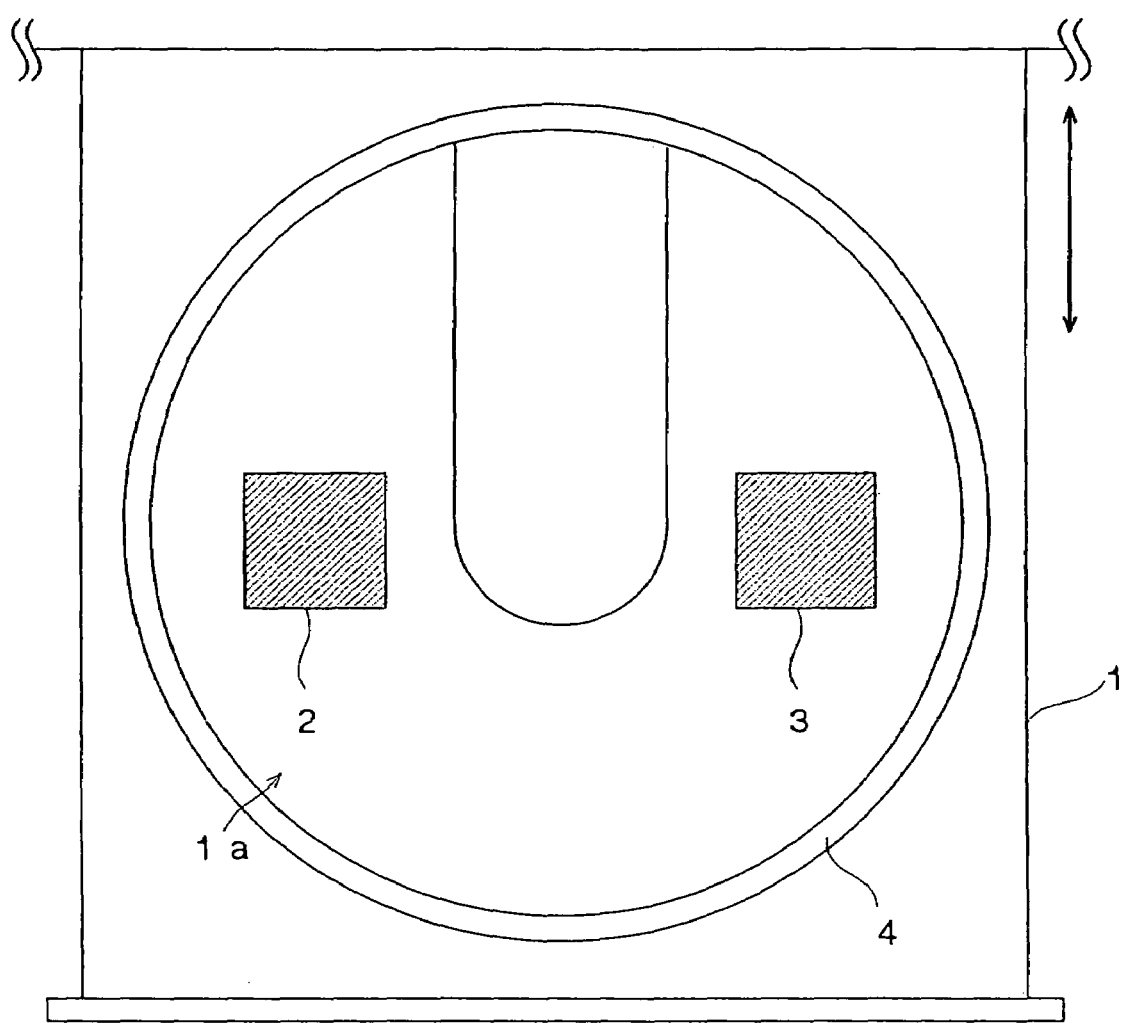
FIG. 14 is a schematic cross-sectional view showing a tray provided with an electrode for detection that is used in a conventional apparatus for discriminating an optical recording medium.
Figure 15:
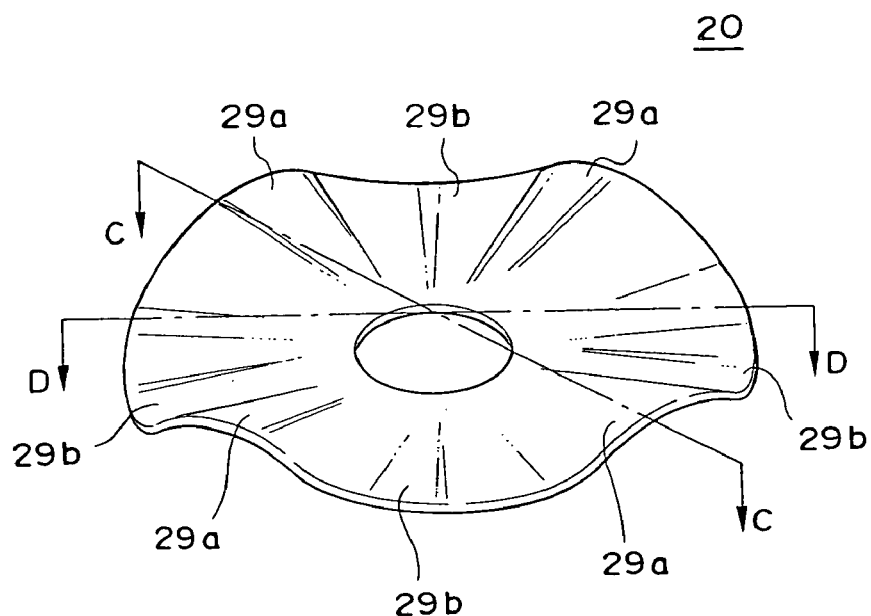
FIG. 15 is a schematic perspective view showing an optical recording medium formed with a periodical undulation in the circumferential direction thereof.
Figure 16:
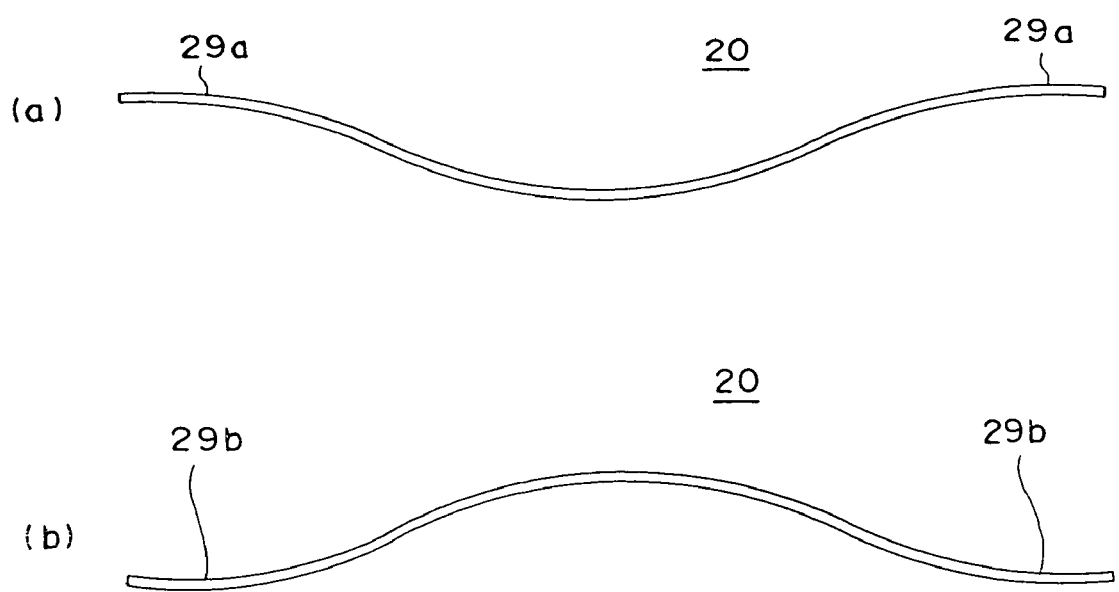
FIG. 16(a) is a schematic cross-sectional view taken along a line C-C in FIG. 15
FIG. 16(b) is a schematic cross-sectional view taken along a line D-D in FIG. 15.
Figure 17:
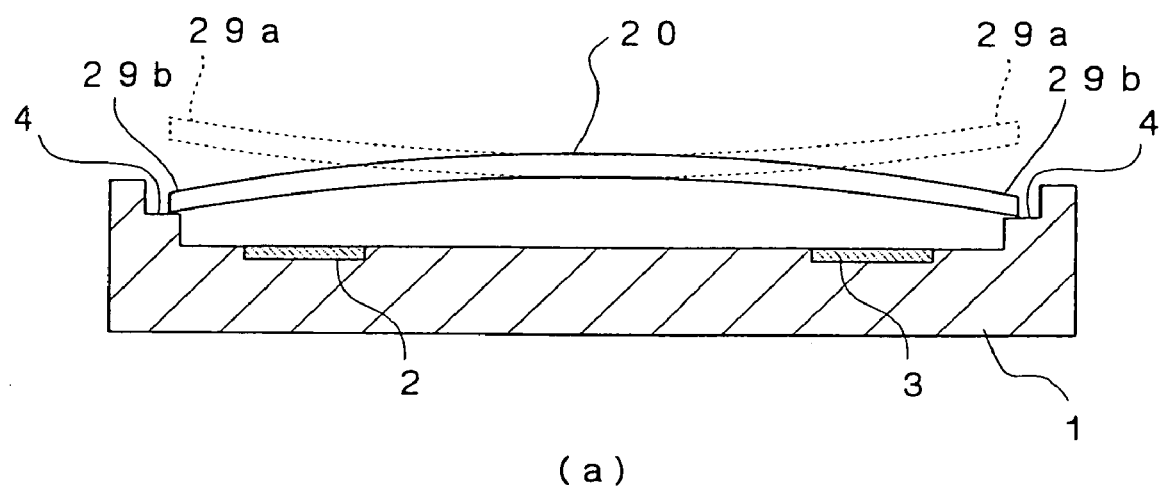
Figure 17:
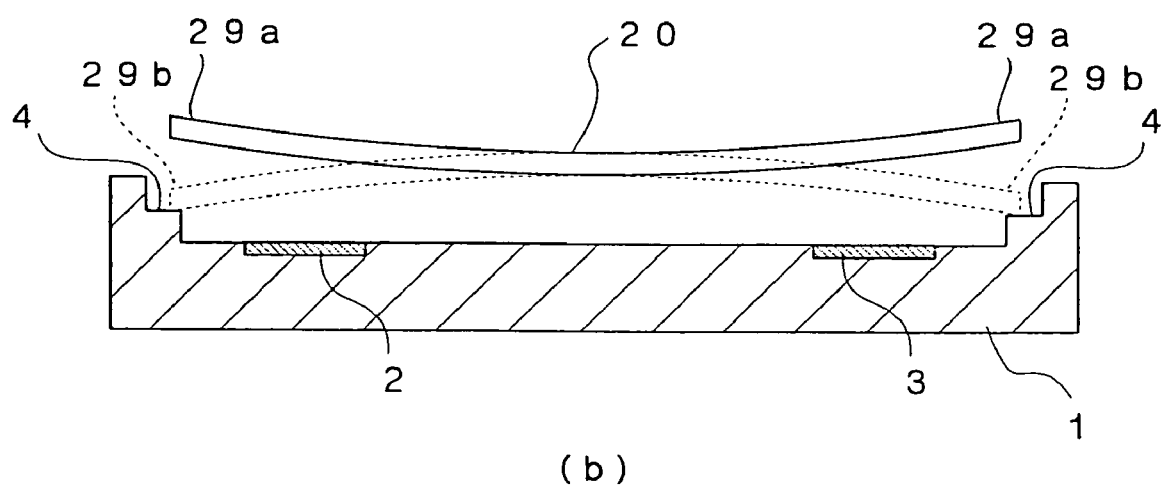

FIG. 3 is a schematic plan view showing a positional relationship between an optical recording medium and the first electrode 11 and the second electrode 12 when the optical recording medium 20 is placed on the tray 41 shown in FIG. 14.

As shown in FIG. 3, when an optical recording medium 20 is placed on the tray 41, the first electrode 11 and the second electrode 12 formed annular-like on the surface of the tray 41 are located inside of the outer circumference of the recording surface 30 of the optical recording medium 20 and along the outer circumference of the recording surface 30 of the optical recording medium 20.

Figure 4:
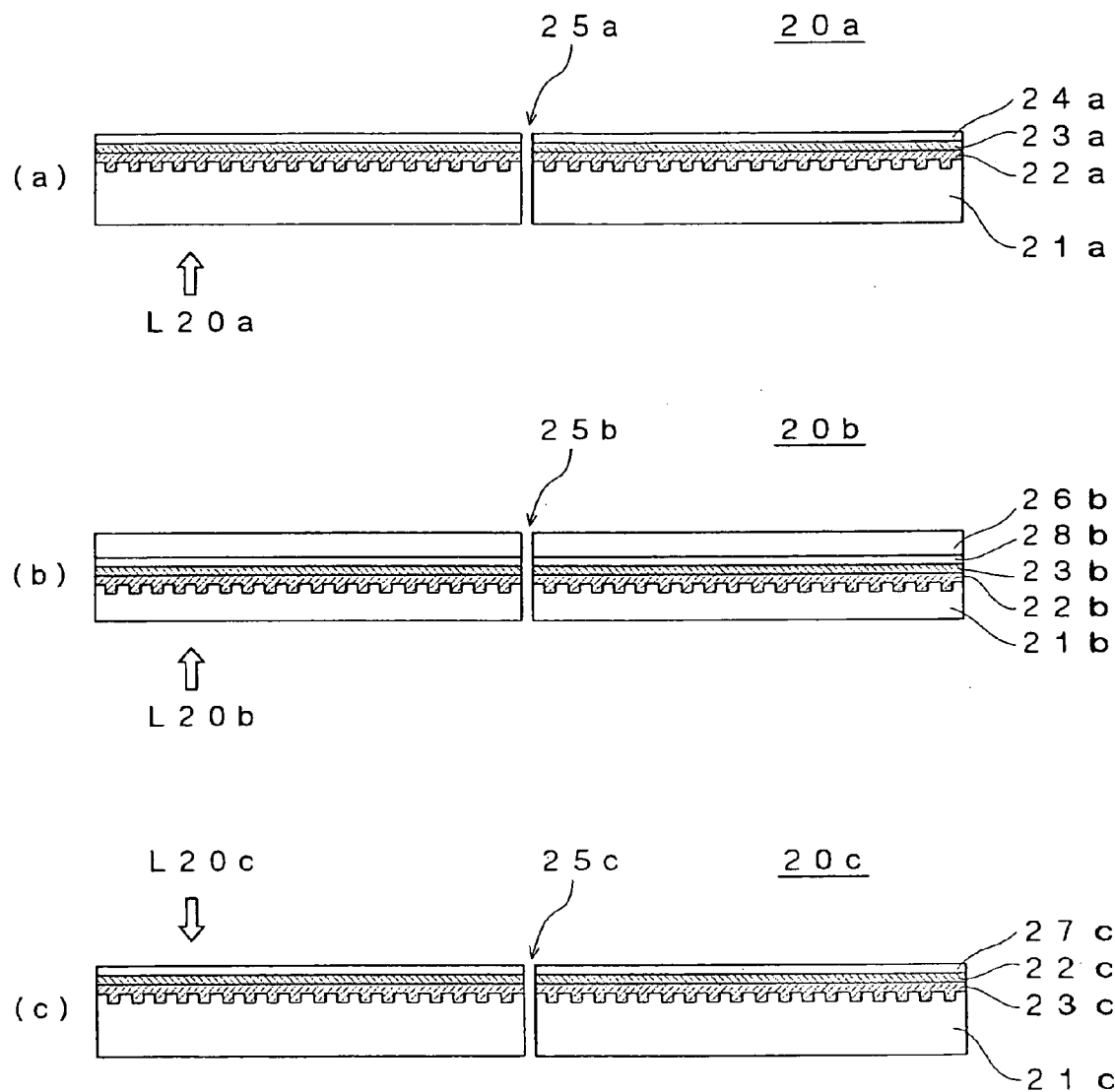

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

As shown in FIG. 4(a), a CD type optical recording medium 20a includes a substrate 21a, a recording layer 22a formed on the substrate 21a, a reflective layer 23a formed on the recording layer 22a and a protective layer 24a formed on the reflective layer 23a, and the central portion of thereof is formed with a hole 25a. In the thus constituted CD type optical recording medium 20a, a laser beam L20a having a wavelength λ of 780 nm is projected thereonto from the side of the substrate 21a, thereby recording data therein and reproducing recorded therein.

The substrate 21a serves to ensure the mechanical strength required by the optical recording medium 20a and an optical path for a laser beam L20a is formed therein.

In the case where the optical recording medium 20a is to be constituted as a write-once optical recording medium (CD-R) or a data rewritable type optical recording medium (CD-RW), grooves and/or lands are formed on the surface of the substrate 21a. The grooves and/or lands serve as a guide track for the laser beam L20a when data are to be recorded or when data are to be reproduced.

The substrate 21a has a thickness of about 1.1 mm and is normally formed of polycarbonate resin.

In the case where the optical recording medium 20a is to be constituted as a write-once optical recording medium (CD-R) or a data rewritable type optical recording medium (CD-RW), the recording layer 22a is formed.

In the case where the optical recording medium 20a is constituted as a write-once optical recording medium (CD-R), the recording layer 22a is formed of organic dye and in the case where the optical recording medium 20a is constituted as a data rewritable type optical recording medium (CD-RW), the recording layer 22a is constituted by a phase change film and dielectric films sandwiching the phase change film.

In a write-once type optical recording medium, data are recorded in the recording layer 22a by transforming a predetermined region of organic dye contained in the recording layer 22a. On the other hand, in a data rewritable type optical recording medium, data are recorded in the recording layer 22a by changing the phase of the phase change film contained in the recording layer 22a between a crystalline state and an amorphous state.

In the case where the optical recording medium 20a is constituted as a ROM type optical recording medium (CD-ROM), no recording layer 22a is formed and data are recorded by pre-pits (not shown) formed on the surface of the substrate 21a when the optical recording medium 20a is fabricated.

The reflective layer 23a serves to reflect the laser beam L20a entering via the substrate 21a so as to emit it from the substrate 21a and is formed so as to have a thickness of 10 to 300 nm.

The reflective layer 23a is formed of metal such as aluminum, silver or the like in order to effectively reflect the laser beam L20a.

In this specification, a layer such as a reflective layer 23a having conductivity is sometimes referred to as "a conductive layer." In the case where the optical recording medium 20a is constituted as a data rewritable type optical recording medium (CD-RW), since the material of the phase change film included in the recording layer 22a normally has conductivity, the recording layer 22a falls in the category of "a conductive layer."

The protective layer 24a serves to physically and chemically protect the recording layer 22a. The protective layer 24a is formed of ultraviolet ray curable resin or the like so as to have a thickness of about 100 μm.

In the thus constituted CD type optical recording medium 20a, the distance between the surface of the substrate 21a through with the laser beam L20a enters and the reflective layer 23a or the recording layer 22a serving as a conductive layer is determined to be about 1.1 mm.

On the other hand, as shown in FIG. 4(b), the DVD type optical recording medium 20b includes a first substrate 21b, a recording layer 22b formed on the first substrate 21b, a reflective layer 23b formed on the recording layer 22b, an adhesive layer 28b formed on the reflective layer 23b and a second substrate 26b formed on the adhesive layer 28b, and the central portion of thereof is formed with a hole 25b. In the thus constituted DVD type optical recording medium 20b, a laser bream L20b having a wavelength λ of 650 nm is projected thereonto from the side of the first substrate 21b, thereby recording data therein and reproducing recorded therein.

The first substrate 21b serves to ensure the mechanical strength required by the optical recording medium 20b and the optical path of the laser beam L20b is formed therein.

In the case where the optical recording medium 20b is to be constituted as a write-once optical recording medium (DVD-R) or a data rewritable type optical recording medium (DVD-RW), grooves and/or lands are formed on the surface of the first substrate 21b. The grooves and/or lands serve as a guide track for the laser beam L20b when data are to be recorded or when data are to be reproduced.

The second substrate 26b corresponds to the protective layer 24a in the CD type optical recording medium 20a.

Each of the first substrate 21b and the second substrate 26b has a thickness of about 1.1 mm and is normally formed of polycarbonate resin.

The recording layer 22b is formed in the case where the optical recording medium 20b is to be constituted as a write-once optical recording medium (DVD-R) or a data rewritable type optical recording medium (DVD-RW).

In the case where the optical recording medium 20b is constituted as a write-once optical recording medium (DVD-R), the recording layer 22b is formed of organic dye and in the case where the optical recording medium 20b is constituted as a data rewritable type optical recording medium (DVD-RW), the recording layer 22b is constituted by a phase change film and dielectric films sandwiching the phase change film.

In the case where the optical recording medium 20b is constituted as a ROM type optical recording medium (DVD-ROM), no recording layer 22b is formed and data are recorded by pre-pits (not shown) formed on the surface of the first substrate 21b when the optical recording medium 20b is fabricated.

The reflective layer 23b serves to reflect the laser beam L20b entering via the first substrate 21b so as to emit it from the first substrate 21b and is formed so as to have a thickness of 10 to 300 nm.

The reflective layer 23b is formed of metal such as aluminum, silver or the like in order to effectively reflect the laser beam L20b.

In the thus constituted DVD type optical recording medium 20b, the distance between the surface of the first substrate 21b through with the laser beam L20b enters and the reflective layer 23b or the recording layer 22b serving as a conductive layer is determined to be about 0.6 mm.

Further, as shown in FIG. 4(c), the next-generation type optical recording medium 20c includes a substrate 21c, a reflective layer 23c formed on the substrate 21c, a recording layer 22c formed on the reflective layer 23c and a light transmission layer 27c formed on the recording layer 22c, and the central portion of thereof is formed with a hole 25c. In the thus constituted next-generation type optical recording medium 20c, a laser bream L20c having a wavelength λ of about 400 nm is projected thereonto from the side of the light transmission layer 27c located on the opposite side from the substrate 21c, thereby recording data therein and reproducing recorded therein.

The substrate 21c serves to ensure the mechanical strength required for the optical recording medium 20c and in the case where the optical recording medium 20c is to be constituted as a write-once optical recording medium or a data rewritable type optical recording medium, grooves and/or lands are formed on the surface of the substrate 21c.

Unlike in the CD type optical recording medium 20a and the DVD type optical recording medium 20b, in the next-generation type optical recording medium 20c, no optical path of the laser beam L20c is formed in the substrate 21c.

The substrate 21c has a thickness of about 1.1 mm and is normally formed of polycarbonate resin.

The reflective layer 23c serves to reflect the laser beam L20c entering via the light transmission layer 27c so as to emit it from the light transmission layer 27c and is formed so as to have a thickness of 10 to 300 nm.

The reflective layer 23c is formed of metal such as aluminum, silver or the like in order to effectively reflect the laser beam L20c.

The recording layer 22c is formed in the case where the optical recording medium 20c is to be constituted as a write-once optical recording medium or a data rewritable type optical recording medium.

In the case where the optical recording medium 20c is constituted as a ROM type optical recording medium, no recording layer 22c is formed and data are recorded by pre-pits (not shown) formed on the surface of the substrate 21c when the optical recording medium 20c is fabricated.

The light transmission layer 27c is a layer in which the optical path of the laser beam L20c is formed.

Although the thickness of the light transmission layer 27c depends upon the kind of the next-generation type optical recording medium 20c, the light transmission layer 27c is formed so as to have a thickness of about 10 to 300 μm.

Although the material preferably used for forming the light transmission layer 27c depends upon the kind of the next-generation type optical recording medium 20c, a dielectric material such as ultraviolet ray curable resin, polycarbonate, polyolefin or the like is normally employed.

Owing to the configuration of the next-generation type optical recording medium 20c in the foregoing manner, in the case where the next-generation type optical recording medium 20c is constituted as a ROM type optical recording medium or a write-once optical recording medium, the distance between the surface of the light transmission layer 27c through with the laser beam L20c enters and the reflective layer 23c serving a conductive layer is determined to be about 10 to 300 μm. On the other hand, in the case where the next-generation type optical recording medium 20c is constituted as a data rewritable type optical recording medium, the distance between the surface of the light transmission layer 27c through with the laser beam L20c enters and the recording layer 22c which is a conductive layer closest to the light transmission layer 27c is determined to be slightly shorter than the distance between the surface of the light transmission layer 27c and the reflective layer 23c.

The apparatus 10 for discriminating an optical recording medium shown in FIGS. 1 to 3 discriminates the kind of an optical recording medium 20 among the optical recording media having different structures in the above described manner as follows.

The tray 41 of the drive is first discharged from the main body 40 of the drive and an optical recording medium 20 is placed on the optical recording medium setting section 41a of the tray 41 by the user.

Figure 5:
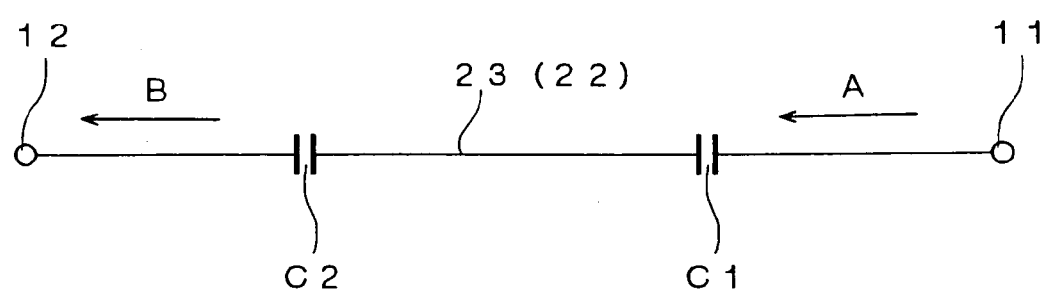
FIG. 5 is a diagram showing a circuit formed between a first electrode and a second electrode.

As a result, a circuit shown in FIG. 5 is formed between the first electrode 11 and the second electrode 12.

In FIG. 5, C1 is a capacitance component constituted by the first electrode 11, the reflective layer 23 or the recording layer 22 and a dielectric material present between the first electrode 11 and the reflective layer 23 or the recording layer 22, and C2 is a capacitance component constituted by the second electrode 12, the reflective layer 23 or the recording layer 22 and a dielectric material present between the second electrode 12 and the reflective layer 23 or the recording layer 22. Here, C1=C2.

Therefore, the values of the capacitance components C1 and C2 depend upon the thickness and dielectric constant of the dielectric material present between the first electrode 11 and second electrode 12 and the reflective layer 23 or recording layer 22. In the case where the optical recording medium 20 placed on the tray 41 is a CD type optical recording medium 20a, they become equal to Ca and in the case where the optical recording medium 20 placed on the tray 41 is a DVD type optical recording medium 20b, they become equal to Cb, where Cb is larger than Ca. On the other hand, in the case where the optical recording medium 20 placed on the tray 41 is a next-generation type optical recording medium 20c, they become equal to Cc, where Cc is larger than Cb.

Then, an alternating current signal A generated by the alternating current signal generation circuit 13 is applied to the first electrode 11 under the control of the control circuit 15 while the optical recording medium 20 is present on the optical recording medium setting section 41a of the tray 41.

As a result, since the alternating current signal A is transmitted to the second electrode 12 via the circuit shown in FIG. 5, an alternating current signal B appearing at the second electrode 12 varies depending upon the values of the capacitance components C1 and C2.

The alternating current signal B appearing at the second electrode 12 is detected by the detection circuit 14 and the control circuit 15 discriminates the kind of the optical recording medium 20 placed on the tray 41 based on the alternating current signal B detected by the detection circuit 14.

More specifically, in the case where the level of the alternating current signal B is equal to that obtained when the values of the capacitance components C1 and C1 are equal to Ca, the control circuit 15 discriminates that the optical recording medium 20 placed on the tray 41 is a CD type optical recording medium 20a and in the case where the level of the alternating current signal B is equal to that obtained when the values of the capacitance components C1 and C1 are equal to Cb, the control circuit 15 discriminates that the optical recording medium 20 placed on the tray 41 is a DVD type optical recording medium 20b. On the other hand, in the case where the level of the alternating current signal B is equal to that obtained when the values of the capacitance components C1 and C1 are equal to Cc, the control circuit 15 discriminates that the optical recording medium 20 placed on the tray 41 is a next-generation type optical recording medium 20c.

In this embodiment, since the first electrode 11 and the second electrode 12 are annular-like formed on the optical recording medium setting section 41a of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41a of the tray 41, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 41a of the tray 41.

Therefore, if the range of the level of the alternating current signal B to be obtained is obtained in advance for each kind of the optical recording media 20 and stored as a table 15a in the control circuit 15, the kind of optical recording media 20 can be discriminated by referring to the table 15a in the control circuit 15.

When the discrimination of the kind of the optical recording medium 20 has been completed, the optical recording medium 20 is rotated by a spindle motor (not shown) and a laser component and an optical system corresponding to the thus discriminated kind of the optical recording medium 20 are selected, thereby emitting a laser beam.

Then, an initial setting operation and the like are effected similarly to in the conventional data recording and reproducing apparatus (drive) and data are recorded in the optical recording medium 20 or data are reproduced from the optical recording medium 20.

Therefore, if the apparatus 10 for discriminating an optical recording medium according to this embodiment is mounted on a data recording and reproducing apparatus (drive), it is possible to immediately discriminate the kind of an optical recording medium 20 set in the data recording and reproducing apparatus prior to projecting a laser beam thereon.

According to this embodiment, since the first electrode 11 and the second electrode 12 are annular-like formed on the optical recording medium setting section 41a of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41a of the tray 41, even in the case where an optical recording medium 20 to be discriminated is formed with periodical undulation in the circumferential direction thereof, the capacitance components C1 and C2 are substantially the same for the same kind of optical recording medium 20 irrespective of how the optical recording medium 20 is placed on the optical recording medium setting section 41a of the tray 41. Therefore, it is possible to accurately discriminate the kind of an optical recording medium 20 even in the case where the optical recording medium 20 is formed with periodical undulation in the circumferential direction thereof.

Figure 6:
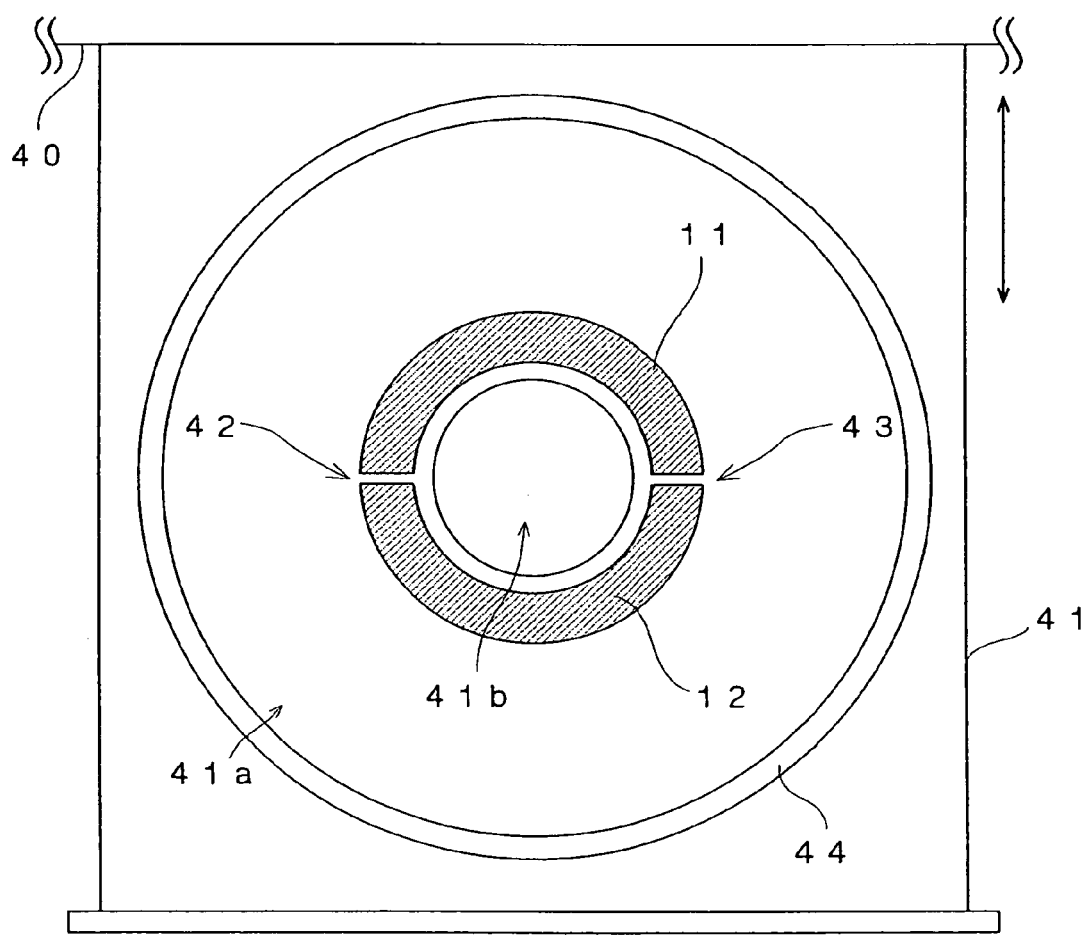
FIG. 6 is a schematic plan view showing a tray which can be accommodated in and discharged from a main body of a drive into which an apparatus for discriminating an optical recording medium that is another preferred embodiment of the present invention is incorporated.

FIG. 6 is a schematic plan view showing a tray which can be accommodated in and discharged from a main body of a drive into which an apparatus for discriminating an optical recording medium that is another preferred embodiment of the present invention is incorporated.

As shown in FIG. 6, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

As shown in FIG. 6, in this embodiment, a first electrode 11 and a second electrode 12 are formed annular-like on the optical recording medium setting section 41a in the vicinity of the opening 41b. Each of the first electrode 11 and the second electrode 12 forms substantially a half of the annular portion and gaps 42 and 43 are formed between the first electrode 11 and the second electrode 12.

Figure 7:
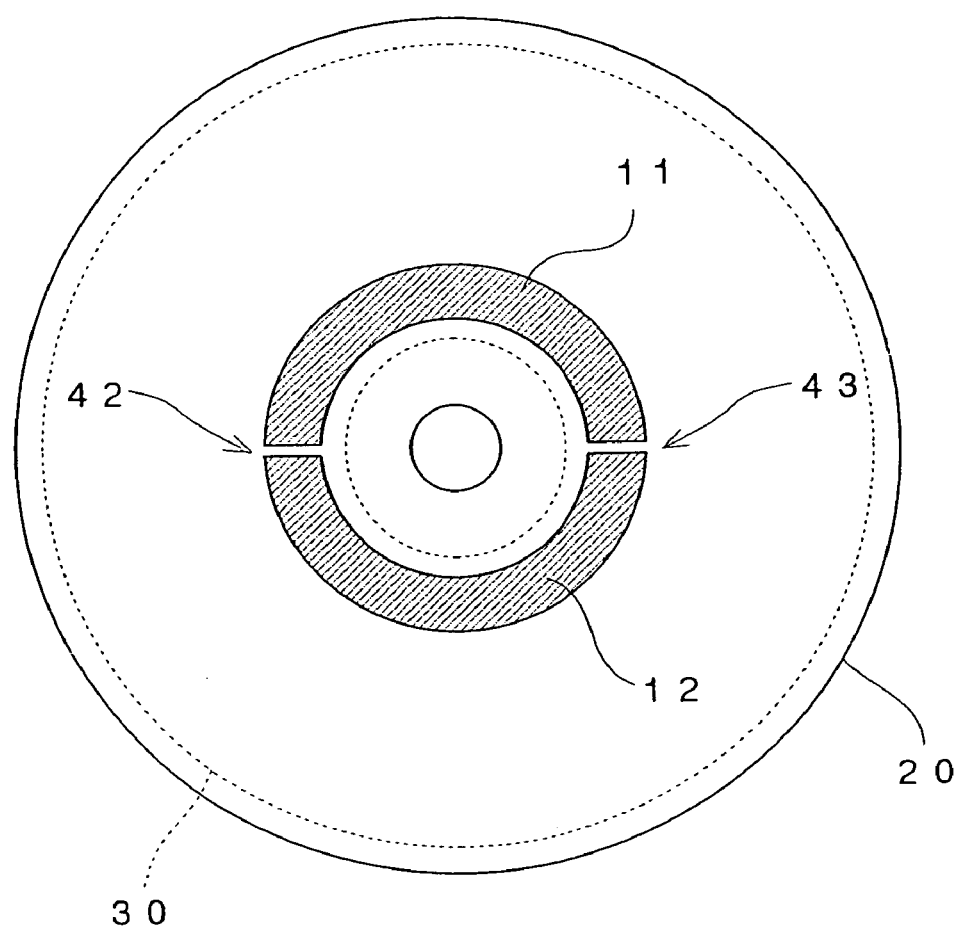
FIG. 7 is a schematic plan view showing a positional relationship between an optical recording medium and a first electrode and a second electrode when the optical recording medium is placed on a tray shown in FIG. 6.

FIG. 7 is a schematic plan view showing a positional relationship between an optical recording medium 20 and the first electrode 11 and the second electrode 12 when the optical recording medium 20 is placed on the tray 41 shown in FIG. 6.

As shown in FIG. 7, when an optical recording medium 20 is placed on the tray 41, the first electrode 11 and the second electrode 12 formed annular-like on the surface of the tray 41 are located inside of the outer circumference of the recording surface 30 of the optical recording medium 20 and along the outer circumference of the recording surface 30 of the optical recording medium 20.

In the apparatus for discriminating an optical recording medium according to this embodiment, similarly to in the apparatus for discriminating an optical recording medium shown in FIG. 2, an optical recording medium 20 to be discriminated is placed on the optical recording medium setting section 41a of the tray 41 and a circuit shown in FIG. 5 is formed, thereby discriminating the kind of the optical recording medium 20.

In this embodiment, since the first electrode 11 and the second electrode 12 are annular-like formed on the optical recording medium setting section 41a of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41a of the tray 41, the capacitance components C1 and C2 are substantially the same for the same kind of optical recording medium 20 irrespective of how the optical recording medium 20 is placed on the optical recording medium setting section 41a of the tray 41 even in the case where an optical recording medium 20 to be discriminated is warped and formed with periodical undulation in the circumferential direction thereof. Therefore, even in the case where an optical recording medium 20 is formed with periodical undulation in the circumferential direction thereof, it is possible to accurately discriminate the kind of an optical recording medium 20.

Figure 8:
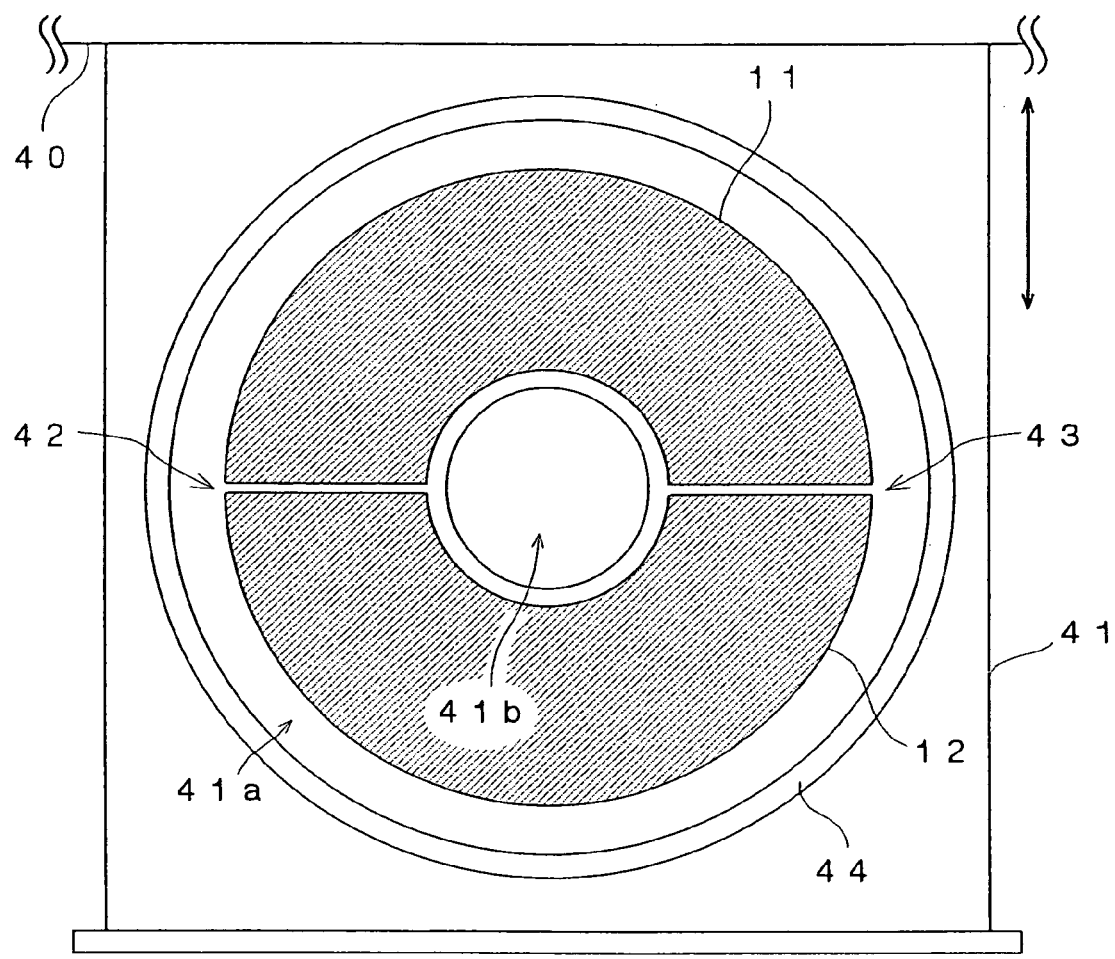
FIG. 8 is a schematic plan view showing a tray which can be accommodated in and discharged from a main body of a drive into which an apparatus for discriminating an optical recording medium that is a further preferred embodiment of the present invention is incorporated.

FIG. 8 is a schematic plan view showing a tray which can be accommodated in and discharged from a main body of a drive into which an apparatus for discriminating an optical recording medium that is a further preferred embodiment of the present invention is incorporated.

As shown in FIG. 8, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

As shown in FIG. 8, a first electrode 11 and a second electrode 12 are formed annular-like over substantially the entire surface of the optical recording medium setting section 41a of the tray 41. Each of the first electrode 11 and the second electrode 12 forms substantially a half of the annular portion and gaps 42 and 43 are formed between the first electrode 11 and the second electrode 12.

Figure 9:
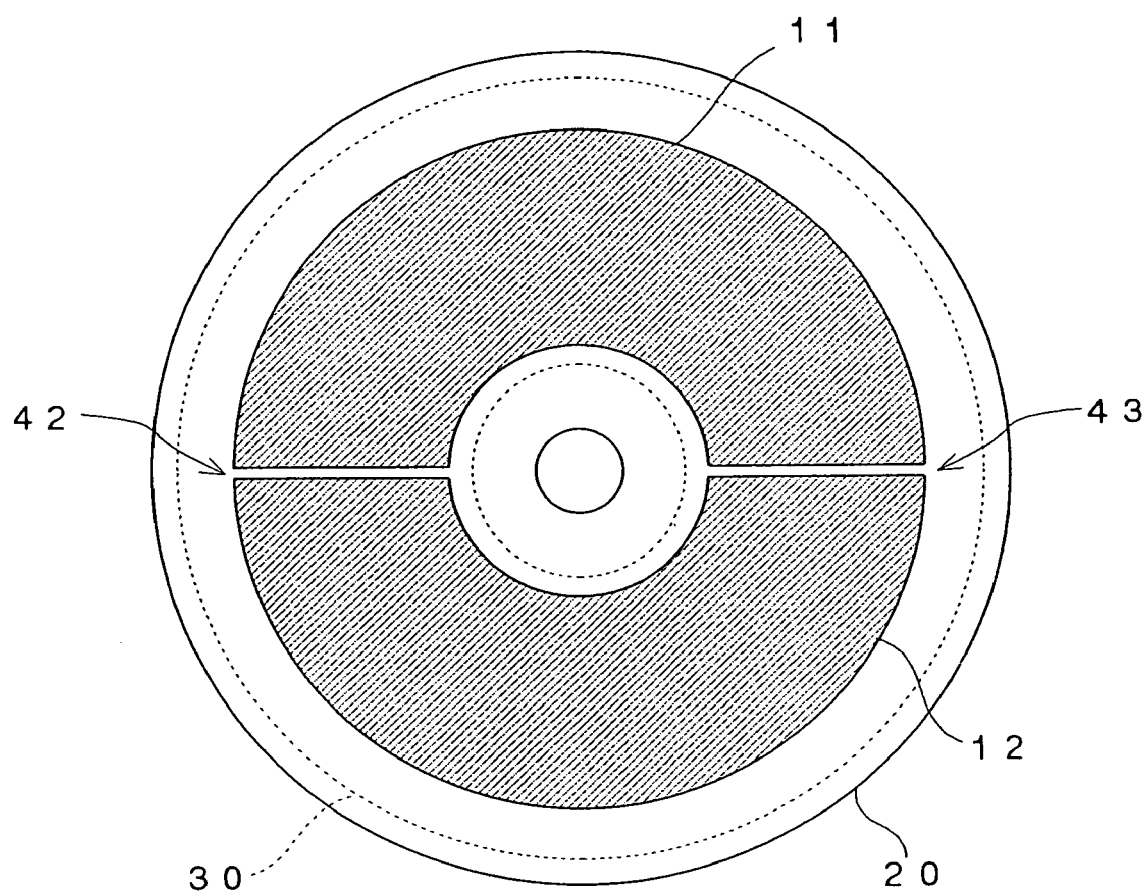
FIG. 9 is a schematic plan view showing a positional relationship between an optical recording medium and a first electrode and a second electrode when the optical recording medium is placed on the tray shown in FIG. 8.

FIG. 9 is a schematic plan view showing a positional relationship between an optical recording medium 20 and the first electrode 11 and the second electrode 12 when the optical recording medium 20 is placed on the tray 41 shown in FIG. 8.

As shown in FIG. 9, when an optical recording medium 20 is placed on the tray 41, the first electrode 11 and the second electrode 12 formed annular-like on the surface of the tray 41 are located so as to face substantially the entire surface of the recording surface 30 of the optical recording medium 20.

In the apparatus for discriminating an optical recording medium according to this embodiment, similarly to in the apparatus for discriminating an optical recording medium shown in FIG. 2, an optical recording medium 20 to be discriminated is placed on the optical recording medium setting section 41a of the tray 41 and a circuit shown in FIG. 5 is formed, thereby discriminating the kind of the optical recording medium 20.

In this embodiment, since the first electrode 11 and the second electrode 12 are annular-like formed over substantially the entire surface of the optical recording medium setting section 41a of the tray 41 and are located so as to face substantially the entire surface of the recording surface 30 of an optical recording medium 20 when an optical recording medium 20 is placed on the optical recording medium setting section 41a of the tray 41, the capacitance components C1 and C2 are substantially the same for the same kind of optical recording medium 20 irrespective of how the optical recording medium 20 is placed on the optical recording medium setting section 41a of the tray 41 even in the case where an optical recording medium 20 to be discriminated is warped and formed with periodical undulation in the circumferential direction thereof. Therefore, even in the case where an optical recording medium 20 is formed with periodical undulation in the circumferential direction thereof, it is possible to accurately discriminate the kind of an optical recording medium 20.

Furthermore, the larger the areas of the first electrode 11 and second electrode 12 are, the more accurately can the kind of an optical recording medium 20 be discriminated even in the case where the optical recording medium 20 is formed with periodical undulation in the circumferential direction thereof. In this embodiment, since the first electrode 11 and the second electrode 12 are formed so as to cover substantially the entire surface of the recording surface 30 of an optical recording medium 20, it is possible to accurately discriminate the kind of an optical recording medium 20.

Figure 10:
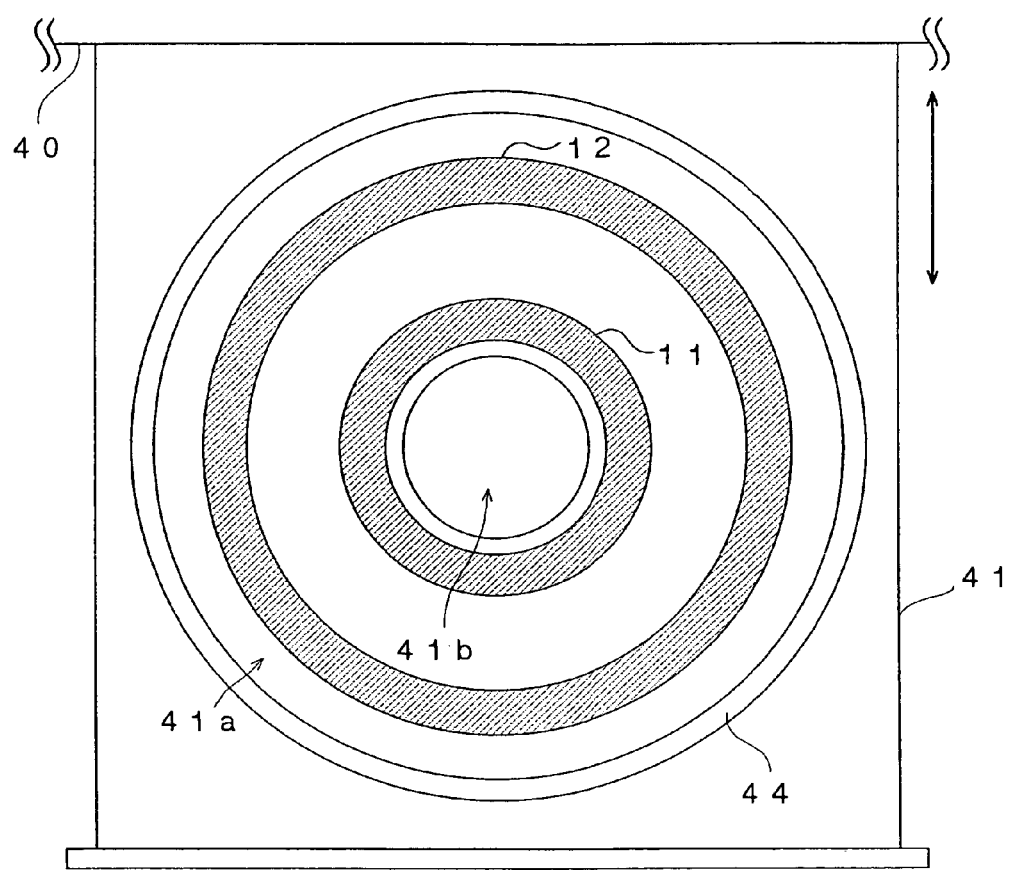
FIG. 10 is a schematic plan view showing a tray which can be accommodated in and discharged from a main body of a drive into which an apparatus for discriminating an optical recording medium that is a further preferred embodiment of the present invention is incorporated.

FIG. 10 is a schematic plan view showing a tray which can be accommodated in and discharged from a main body of a drive into which an apparatus for discriminating an optical recording medium that is a further preferred embodiment of the present invention is incorporated.

As shown in FIG. 10, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

As shown in FIG. 10, in this embodiment, a first electrode 11 is annular-like formed on the optical recording medium setting section 41a in the vicinity of the opening 41b and a second electrode 12 is annular-like formed on the optical recording medium setting section 41a in the vicinity of a shoulder portion 44.

Figure 11:
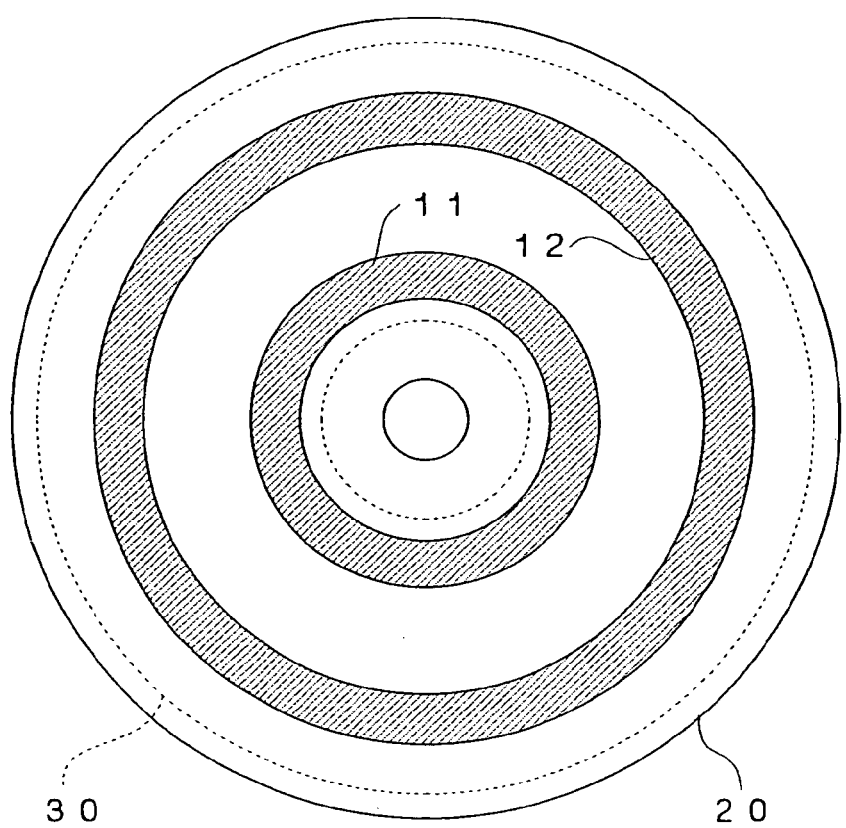
FIG. 11 is a schematic plan view showing a positional relationship between an optical recording medium and a first electrode and a second electrode when the optical recording medium is placed on the tray shown in FIG. 8.

FIG. 11 is a schematic plan view showing a positional relationship between an optical recording medium 20 and the first electrode 11 and the second electrode 12 when the optical recording medium 20 is placed on the tray 41 shown in FIG. 8.

As shown in FIG. 11, when an optical recording medium 20 is placed on the tray 41, the first electrode 11 formed annular-like on the surface of the tray 41 is located outside of the inner circumference of the recording surface 30 of the optical recording medium 20 and along the inner circumference of the recording surface 30 of the optical recording medium 20 and the second electrode 12 formed annular-like on the surface of the tray 41 is located inside of the outer circumference of the recording surface 30 of the optical recording medium 20 and along the outer circumference of the recording surface 30 of the optical recording medium 20.

In the apparatus for discriminating an optical recording medium according to this embodiment, similarly to in the apparatus for discriminating an optical recording medium shown in FIG. 2, an optical recording medium 20 to be discriminated is placed on the optical recording medium setting section 41a of the tray 41 and a circuit shown in FIG. 5 is formed, thereby discriminating the kind of the optical recording medium 20.

In this embodiment, the first electrode 11 is annular-like formed on the optical recording medium setting section 41a in the vicinity of the opening 41b and the second electrode 12 is annular-like formed on the optical recording medium setting section 41a in the vicinity of the shoulder portion 44 so that when an optical recording medium 20 is placed on the tray 41, the first electrode 11 formed annular-like on the surface of the tray 41 is located outside of the inner circumference of the recording surface 30 of the optical recording medium 20 and along the inner circumference of the recording surface 30 of the optical recording medium 20 and the second electrode 12 formed annular-like on the surface of the tray 41 is located inside of the outer circumference of the recording surface 30 of the optical recording medium 20 and along the outer circumference of the recording surface 30 of the optical recording medium 20. Therefore, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 41a of the tray 41. Accordingly, even in the case where an optical recording medium 20 is formed with periodical undulation in the circumferential direction thereof, it is possible to accurately discriminate the kind of an optical recording medium 20.

Figure 12:
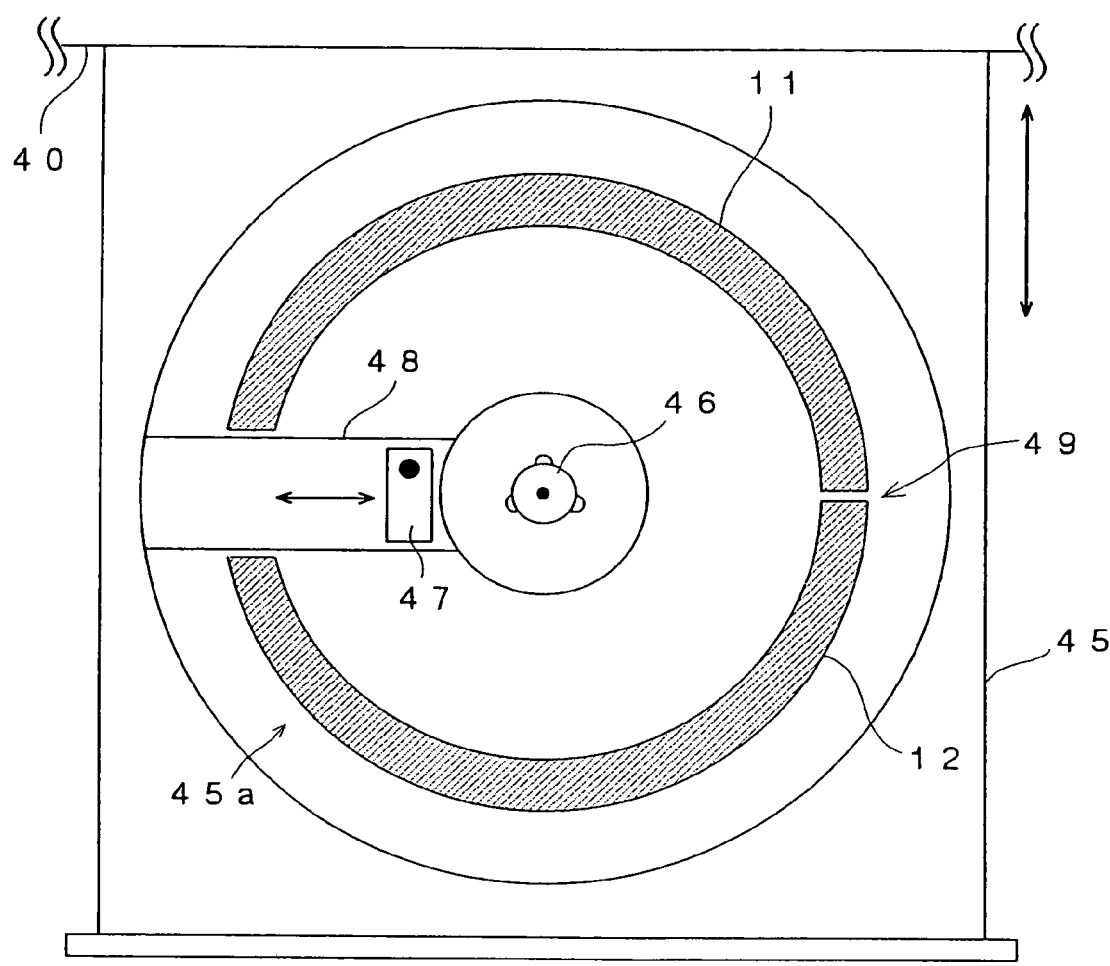
FIG. 12 is a schematic plan view showing a tray which can be accommodated in and discharged from a main body of a drive into which an apparatus for discriminating an optical recording medium that is a further preferred embodiment of the present invention is incorporated and on which a spindle motor is mounted.

FIG. 12 is a schematic plan view showing a tray which can be accommodated in and discharged from a main body of a drive into which an apparatus for discriminating an optical recording medium that is a further preferred embodiment of the present invention is incorporated and on which a spindle motor is mounted.

As shown in FIG. 12, in this embodiment, the tray 45 is constituted in such a manner that the user causes a spindle motor 46 to directly chuck an optical recording medium 20. Trays constituted in the manner of the tray 45 are widely used in note-type personal computers.

As shown in FIG. 12, an optical system 47 for emitting a laser beam is housed in the tray 45 and the tray 45 is formed with an optical system movable region 48 so that the optical system 47 can be moved in a radial direction of an optical recording medium 20 when data are recorded in the optical recording medium 20 chucked by the spindle motor 46 or when data are reproduced from an optical recording medium 20.

As shown in FIG. 23, in this embodiment, a first electrode 11 and a second electrode 12 are annular-like formed along the outer circumference of an optical recording medium setting section 45a of the tray 45. Each of the first electrode 11 and the second electrode 12 forms substantially a half of the annular portion and the optical system movable region 48 and a gap 49 is formed between the first electrode 11 and the second electrode 12.

In this embodiment, when an optical recording medium 20 is placed on the tray 45, the first electrode 11 and the second electrode 12 annular-like formed on the surface of the tray 45 are located along the outer circumference of the recording surface 30 of the optical recording medium 20.

In this embodiment, the first electrode 11 and the second electrode 12 are annular-like disposed along the outer circumference of an optical recording medium setting section 45a of the tray 45 and when an optical recording medium 20 is placed on the tray 45, the first electrode 11 and the second electrode 12 annular-like formed on the surface of the tray 45 are located along the outer circumference of the recording surface 30 of the optical recording medium 20. Therefore, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 45a of the tray 45. Hence, even in the case where an optical recording medium 20 is formed with periodical undulation in the circumferential direction thereof, it is possible to accurately discriminate the kind of an optical recording medium 20.

Figure 13:
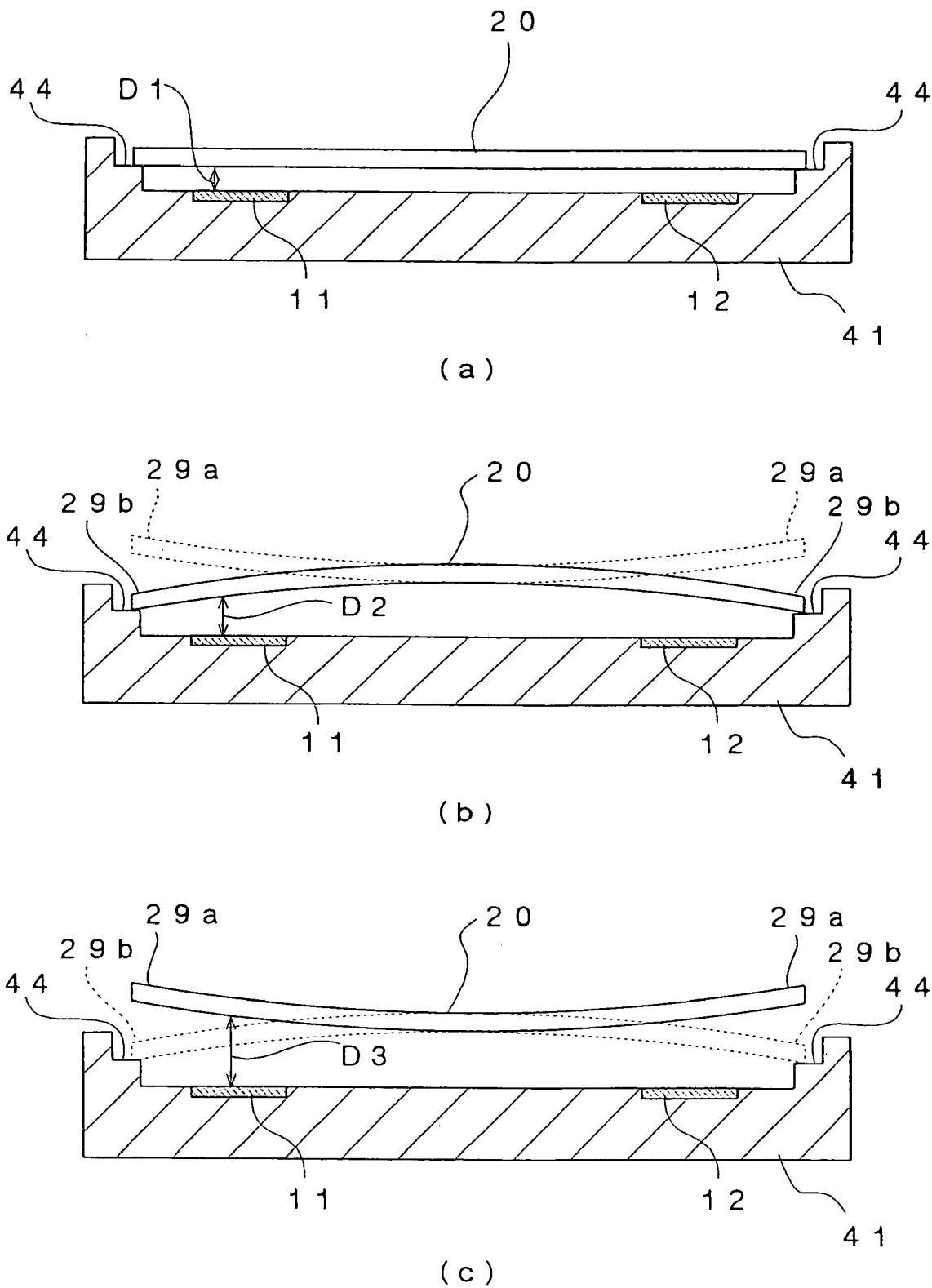

FIG. 13 is a schematic cross-sectional view showing the state where an optical recording medium is placed on a tray, wherein FIG. 13(a) shows the case where an optical recording medium formed with no periodical undulation in the circumferential direction thereof is placed on the tray and FIGS. 13(b) and (c) shows the cases where an optical recording medium formed with a periodical undulation in the circumferential direction thereof is placed on the tray.

As shown in FIG. 13(a), when an optical recording medium formed with no periodical undulation in the circumferential direction thereof is placed on a tray 41, the distances D1 between a first electrode 11 and a second electrode 12 and the surface of the optical recording medium 20 are constant.

To the contrary, when an optical recording medium 20 formed with periodical undulation in the circumferential direction thereof is placed on the tray 41, the distances between a first electrode 11 and a second electrode 12 and the surface of the optical recording medium 20 vary between the minimum distance D2 and the maximum distance D3 depending upon the position in the circumference direction of the optical recording medium 20 and as periodical undulation in the circumferential direction the optical recording medium 20 becomes large, the difference ΔD between the maximum distance D3 and the minimum distance D2 becomes large.

Therefore, it is preferable to set the value the distance D1 to be equal to the height of a shoulder portion 44 and determine areas and positions of the first electrode 11 and the second electrode 12 in relation to the minimum distance D2, the maximum distance D3 and the difference ΔD between the maximum distance D3 and the minimum distance D2 when each kind of an optical recording medium 20 is formed with the maximum undulation allowed by the standard so that the kind of an optical recording medium 20 can be accurately discriminated even in the case where each kind of an optical recording medium is formed with the maximum undulation allowed by the standard.

The present invention has thus been shown and described with reference to specific embodiments. However, it should be noted that the present invention is in no way limited to the details of the described arrangements but changes and modifications may be made without departing from the scope of the appended claims.

For example, in the embodiment shown in FIG. 10, although the first electrode 11 is annular-like formed on the optical recording medium setting section 41a in the vicinity of the opening 41b and the second electrode 12 is annular-like formed on the optical recording medium setting section 41a in the vicinity of a shoulder portion 44, it is possible to annular-like form the second electrode 12 on the optical recording medium setting section 41a in the vicinity of the opening 41b and annular-like form the first electrode 11 on the optical recording medium setting section 41a in the vicinity of a shoulder portion 44.

Further, in the embodiment shown in FIG. 10, although the first electrode 11 and the second electrode 12 are disposed to be spaced from each other in a radial direction of the optical recording medium and to extend over substantially 360 degrees around the center of the tray 41, it is not absolutely necessary to dispose the first electrode 11 and the second electrode 12 over substantially 360 degrees around the center of the tray 41 and it is sufficient for the first electrode. 11 and the second electrode 12 to be disposed over substantially 180 degrees around the center of the tray 41. Preferably, the first electrode 11 and the second electrode 12 are disposed over an angle equal to or larger than substantially 270 degrees around the center of the tray 41.

Furthermore, in the embodiment shown in FIG. 12, although the first electrode 11 and the second electrode 12 are annular-like formed along the outer circumference of the optical recording medium setting section 45*a* of the tray 45, it is possible to form the first electrode 11 and the second electrode 12 in the vicinity of and along the inner circumference of the optical recording medium setting section 45*a* of the tray 45 or to form the first electrode 11 and the second electrode 12 over substantially the entire surface of the optical recording medium setting section 45*a* of the tray 45. Further, it is possible to provide the first electrode 11 and the second electrode 12 on the tray 41 at a portion corresponding to the vicinity of the inner circumference of the recording surface 30 of an optical recording medium 20 or to form the second electrode 12 and the first electrode 11 on the tray 41 at a portion corresponding to the vicinity of the outer circumference of the recording surface 30 of an optical recording medium 20. In the case where the first electrode 11 and the second electrode 12 are provided on a tray 45 widely used for note-type personal computers or the like, if space required for disposing the first electrode 11 and the second electrode 12 is restricted, it is preferable to provide the first electrode 11 and the second electrode 12 in the vicinity of and along the inner circumference of the optical recording medium setting section 45*a* of the tray 45.

Moreover, in the embodiments shown in FIGS. 2, 6 and 8, although the first electrode 11 and the second electrode 12 are formed over substantially 180 degrees around the center of the tray 41, it is not absolutely necessary to form the first electrode 11 and the second electrode 12 over substantially 180 degrees around the center of the tray 41 and the first electrode 11 and the second electrode 12 may be formed at symmetrical positions with respect to a straight line passing through the center of the tray 41 so that each of them is formed over an angle equal to or larger than 90 degrees.

Further, in the above described embodiment, although each of the first electrode 11 and the second electrode 12 is annular-like formed on the tray 41, 45, it is not absolutely necessary to accurately annular-like form each of the first electrode 11 and the second electrode 12 and it is sufficient for each of the first electrode 11 and the second electrode 12 to be formed substantially annular-like.

Furthermore, in the above described embodiment, although the kind of an optical recording medium 20 is discriminated by employing the first electrode 11 and the second electrode 12 and detecting the alternating current signal B appearing at the second electrode 12 when the alternating current signal A is applied to the first electrode 11, it is possible to discriminate the kind of an optical recording medium 20 by employing a planar-coil like electrode and detecting an eddy current generated by supplying an electrical current to the planar-coil like electrode.

According to the present invention, it is possible to provide an apparatus for discriminating an optical recording medium and a method for discriminating an optical recording medium which can reliably discriminate the kind of an optical recording medium.

Further, according to the present invention, it is possible to provide an apparatus for discriminating an optical recording medium and a method for discriminating an optical recording medium which can reliably discriminate the kind of an optical recording medium even in the case where the optical recording medium to be discriminated is formed with periodical undulation in the circumferential direction thereof.

Furthermore, according to the present invention, it is possible to provide an apparatus for discriminating an optical recording medium and a method for discriminating an optical recording medium constituted so as to be irradiated with a laser beam from a side opposite to a substrate, which can reliably discriminate the kind of an optical recording medium.

The invention claimed is:

1. An apparatus for discriminating an optical recording medium having at least a first dielectric layer, a second dielectric layer and a conductive layer formed between the first dielectric layer and the second dielectric layer, the apparatus for discriminating an optical recording medium comprising:
    a first electrode disposed over an angle approximately equal to or larger than substantially 180 degrees around a center of a tray on which an optical recording medium is to be placed;
    a second electrode disposed over an angle approximately equal to or larger than substantially 180 degrees around a center of a tray on which an optical recording medium is to be placed, such that the first and second electrodes, when combined, extend approximately 360 degrees around the center of the tray; and
    means for applying a signal for detection to the first electrode, thereby discriminating the kind of an optical recording medium.

2. An apparatus for discriminating an optical recording medium in accordance with claim 1, wherein the first electrode and the second electrode are disposed to be spaced from each other and form a substantially annular pattern around the center of the tray.

3. An apparatus for discriminating an optical recording medium in accordance with claim 2, wherein the first electrode and the second electrode are disposed to be spaced from each other in a circumferential direction of the optical recording medium to be placed on the tray and to each extend over 180 degrees around the center of the tray.

4. An apparatus for discriminating an optical recording medium in accordance with claim 2, wherein the first electrode and the second electrode are disposed to be spaced from each other in a radial direction of the optical recording medium to be placed on the tray and each extend over an angle just slightly less than 180 degrees around the center of the tray.

5. An apparatus for discriminating an optical recording medium in accordance with claim 4, wherein the first electrode and the second electrode are disposed to be spaced from each other in a radial direction of the optical recording medium to be placed on the tray and to extend over substantially 360 degrees around the center of the tray.

6. A method for discriminating an optical recording medium having at least a first dielectric layer, a second dielectric layer and a conductive layer formed between the first dielectric layer and the second dielectric layer, the method for discriminating an optical recording medium comprising:
    applying a signal for detection to an electrode disposed over an angle approximately equal to or larger than 180 degrees around a center of a tray on which an optical recording medium is placed, the signal being applied to portion of the optical recording medium that extends approximately 180 degrees or more around the optical recording medium;

receiving at a second electrode a signal that has passed through a radial portion of the optical recording medium that is greater than 180 degrees, the second electrode being disposed over an angle approximately equal to or larger than substantially 180 degrees around a center of the tray on which an optical recording medium is placed;

processing the received signal, thereby discriminating the kind of an optical recording medium which has been placed in the tray.

7. A method for discriminating an optical recording medium having at least a first dielectric layer, a second dielectric layer and a conductive layer formed between the first dielectric layer and the second dielectric layer, the method for discriminating an optical recording medium comprising:

applying a signal for detection to a first electrode; and detecting a signal appearing at a second electrode whose value depends upon the kind of an optical recording medium when the signal for detection is applied to the first electrode, wherein the first electrode and the second electrode are disposed spaced from each other in a circumferential direction of the optical recording medium to be placed on a tray so that each of the them extends over an angle approximately equal to or larger than substantially 180 degrees around the center of the tray.

8. A method for discriminating an optical recording medium in accordance with claim 7, wherein the first electrode and the second electrode are disposed to be spaced from each other in a radial direction of the optical recording medium to be placed on the tray so that each of them extends over an angle substantially equal to 360 degrees around the center of the tray.

9. An apparatus for discriminating an optical recording medium having at least a first dielectric layer, a second dielectric layer and a conductive layer formed between the first dielectric layer and the second dielectric layer, the apparatus for discriminating an optical recording medium comprising:

a first electrode disposed in a tray and extending radially over an angle approximately equal to or larger than substantially 180 degrees around a center of a tray on which an optical recording medium is to be placed;

a second electrode disposed over an angle approximately equal to or larger than substantially 180 degrees around a center of a tray on which an optical recording medium is to be placed, the second electrode being spaced from the first electrode in a circumferential in an outward direction of the optical recording medium to be placed in the tray; and a circuit structured to apply a signal for detection to the first electrode and sense a response at the second electrode to thereby determine the kind of optical recording medium placed in the tray.

10. The apparatus according to claim 9 wherein the first electrode and the second electrode each extend 360 degrees around the center of the tray and the first electrode is positioned on an inner circumference of the tray from the second electrode.

* * * * *